United States Patent [19]

Glegg

[11] Patent Number: 4,736,968
[45] Date of Patent: Apr. 12, 1988

[54] COUPLING DEVICE FOR COUPLING A HOSE TO A DRAIN PIPE

[76] Inventor: Keith Glegg, 514 Foxview Place, Ottawa, Ontario, Canada, K1K 4C4

[21] Appl. No.: 928,371

[22] Filed: Nov. 10, 1986

Related U.S. Application Data

[63] Continuation-in-part of Ser. No. 641,564, Aug. 16, 1984, abandoned.

[51] Int. Cl.$^4$ .............................................. F16L 45/00
[52] U.S. Cl. ................................... 285/121; 285/158; 285/345; 285/360
[58] Field of Search ............... 285/360, 361, 376, 401, 285/402, 8, 155, 158, 340; 134/166 C; 4/321, 323

[56] References Cited

U.S. PATENT DOCUMENTS

| 794,165 | 7/1905 | Dozier et al. | 285/155 X |
|---|---|---|---|
| 2,493,577 | 1/1950 | Franklin | 285/8 X |
| 3,605,135 | 9/1971 | Tan | 134/166 C X |
| 4,133,347 | 1/1979 | Mereer | 285/402 X |
| 4,234,217 | 11/1980 | Sakamoto et al. | 285/158 X |
| 4,274,549 | 6/1981 | Germain | 285/340 X |
| 4,319,366 | 3/1982 | Baker, Jr. et al. | 4/321 |

FOREIGN PATENT DOCUMENTS

| 219915 | 2/1962 | Austria | 285/376 |
|---|---|---|---|
| 118259 | 5/1909 | Canada . | |
| 128526 | 10/1910 | Canada . | |
| 788352 | 6/1968 | Canada . | |
| 1006402 | 3/1977 | Canada . | |
| 1010922 | 5/1977 | Canada . | |
| 1096899 | 3/1981 | Canada . | |

Primary Examiner—Randolph A. Reese
Assistant Examiner—Anthony Knight
Attorney, Agent, or Firm—Birch, Stewart, Kolasch & Birch

[57] ABSTRACT

A novel device for use in combination with a coupling device for coupling a drain hose to a drain pipe outlet from a waste holding tank of a trailer is provided herein. It includes a hollow cylindrical section to which that drain hose is adapted to be clamped. An aperture of a specifically-recited size, and located at a specifically recited site surrounded by a hollow shaft covered with a slitted elastomeric cover, is provided in the hollow cylindrical collar for the insertion therethrough of a flushing hose so that the flushing hose is insertable through that slit and into the aperture, through the hollow cylindrical section, through a blade valve which is disposed in the drain pipe and directly into the waste holding tank. Flushing water may thus be directly injected into the waste holding tank while leakage of flushed water from the waste holding tank through the aperture is minimized. A circular ring-like flange is secured to the end of the section which is remote from the drain hose. Finally, a connector extends from the exposed face of the flange for providing quick connect-/disconnect engagement to cooperating members projecting from the end of the drain pipe.

3 Claims, 2 Drawing Sheets

COUPLING DEVICE FOR COUPLING A HOSE TO A DRAIN PIPE

This application is a continuation-in-part of copending applicaiton Ser. No. 641,564, filed on Aug. 16, 1984 and now abandoned.

BACKGROUND OF THE INVENTION (i) Field of the Invention

This invention relates to an attachment for flushing waste holding tanks of trailers.

(ii) Nature of the Prior Art

The modern camping trailer equipped with a flush-toilet is frequently provided with a reservoir which forms an integral part of the trailer and which serves as a waste holding-tank for the mixture of liquid and solid waste deposited in the toilet by the occupants of the trailer. For normal occupancy of the trailer, the holding-tank is emptied at intervals of a few days.

The waste holding-tank will typically have capacity of forty or more liters and be equipped with an outlet drain-pipe of about 10 cm diameter. This drain-pipe is equipped with a simple, hand-operated valve with which it is closed or opened as required. This valve is, e.g. a blade valve, which usually has an interior opening of the same size as the internal diameter of the drain pipe leading from the waste holding tank so that the contents of the waste holding tank are evacuated by unrestricted gravity discharge. In addition, the drain-pipe is generally equipped with fittings for conveniently connecting it to a flexible drain-hose of about the same diameter as the pipe itself and about two meters long, equipped at one end, for securement in complementary fashion, to the pipe. When the valve is opened, the drain-hose serves to direct the waste from the holding-tank into the collection devices of the types with which dumping stations are provided, in many campsites and other locations, for receiving the waste from trailer waste holding-tanks.

It is well known, however, that the emptying operation, even when executed with care, frequently results in spillage of some of the liquid and solid waste from the waste holding-tank in the area surrounding the dump station. This is not simply a source of embarrassment to the trailer operator but, more seriously, the source of distinctly unhygienic conditions which prevail in the vicinity of most such dump stations.

One major contributor to this spillage of waste from the holding-tank of the trailer is the fact that the holding tank is not adequately emptied by simply allowing the contents to flow out, via the drain-hose, into the receptacle of the dump station. In order fully to empty the holding-tank of solids, it is necessary to flush the holding tank out with water from a water-hose that is usually provided at trailer dumps for this purpose.

The flushing operation is generally carried out after detaching the drain-hose. The water-hose is then inserted into the holding-tank via the open end of the drain-pipe and through the open valve. The result is that the flushing water and the residual solids in the holding-tank, no longer guided by the drain-hose, frequently fall outside the receptacle provided in the dump station. This leads to the unhygienic conditions referred to previously.

It would therefore be highly desirable to provide a simple device which allows the holding-tank of the trailer to be flushed out with the water-hose while keeping the drain-hose attached to the drain-pipe of the holding-tank so as to continue to direct the flushed-out waste, by means of the drain-hose, into the collector of the dump station and so avoid the spillage of waste in its vicinity.

The concepts of a dual fluid connection and rapid connect/disconnect devices have been provided in non-analogous art. For example, Canadian Patent No. 118,259, issued 11 May 1909, to Herman E. Loebe, provided a pipe having an outlet head, and an annular shoulder at the junction of the head with the pipe, in combination with a fitting provided with a conical opening for receiving the head. A tubular operating lever having its lower portion bifurcated, straddled the fitting and was pivoted thereto. A slotted collar engaged the annular shoulder, and links connected the collar with the operating lever. The fitting was provided with a segmental lug for engagement by the detent. In this way, the operating lever was retained in its adjusted position, the detent being grooved to permit it to straddle the lug.

Canadian Patent No. 788,352, issued June 25, 1968, to John H. Schmid, provided a fitting for batteries of wall mounted wall water closets. The patentee provided a drainage system comprising a hollow body having a longitudinal central axis adapted to be connected to a drain line. A flange defined an opening in one side of the hollow body. A generally Z-shaped, hollow rigid arm was provided, having an inlet end and an outlet end and an elongated intermediate part. A flange was provided at the outlet end defining an opening, the opening in the body being substantially larger than the opening at the outlet end of the arm, each of the flanges being radially extending from their respective arm and body. The flanges on the outlet end of the arm were so sized and shaped with respect to the flanges on the body as completely to overlie and seal the edges of the opening in the hollow body when moved to any permissible angle of adjustment with respect thereto. Connecting means were provided on the inlet end of the rigid arm to connect a water closet thereto. Means were provided for swingably connecting the flanges to permit relative movement between the body and the rigid arm, thereby to swing the arm relative to the body through a range of angular positions and to move the connecting means in a substantially straight line generally perpendicular to the axis of the fitting body. The openings in the body and arm were in full, unrestricted fluid flow communication to all angular positions of adjustment. Fastening means were provided to secure the flanges in fluid-tight adjusted position.

Canadian Patent No. 1,006,402, issued Mar. 8, 1977, to J. W. Plauka et. al., provided pipe fittings, e.g. tee fittings, wye fittings, elbow fittings or the like out of synthetic plastics materials. In the procedure taught by the patentees, at least two pipe sections were connected together by forming complementary edges in the pipe section. The formed edges were placed into engagement with one another in a complementary fashion so as to form a non-linear fitting. Thereafter, at predetermined time intervals, a plurality of liquid mixture coating layers of flexible resin were applied to the external surfaces of the pipe section over the engaging edges.

Canadian Patent No. 1,096,899, issued May 3, 1981, to J. Bain, provided a safety connection for use in partial rebreathing anesthetics systems. The connection comprised a rigid tubular member, the rigid tubular member having, in axial alignment, a first tubular end portion and a second tubular end portion. The tubular member had a substantially centrally located portion of wider diameter than the major portion of the end portions. A first flexible tubing having an end portion was concentrically frictionally positioned on the first end portion. The second end portion had a tube stub extending axially beyond the second end portion and a diameter less than the second portion. The centrally located portion of wider diameter had a tubular stub having a bore therethrough in communication internally with respect to the rigid tubular member, and at an angle less than 90° with respect to the axis of the rigid tubular member in the direction towards the second end portion. The stub had a second flexible tubing threaded therethrough into the rigid tubular member and through the first flexible tubing. The second flexible tubing had an end portion fitted with a tubular connecting means.

In the realm of quick connect/disconnect devices, Canadian Patent No. 128,526, issued Oct. 4, 1910, to J. W. Roberts, provided an improvement in a hose coupling, including the combination of the two parts of the coupling, and a hooked coupling piece on each part. A keeper was also provided on each part. The coupling piece and keeper on one part were adapted to engage the keeper and coupling piece of the other part. A sliding bolt was carried by each part. A keeper was provided on each part with which the bolt on the adjoining part was adapted to cooperate. The keepers and bolts had an inclined engagement with one another, whereby the coupling could be tightened and locked.

In Canadian Patent No. 1,010,922, issued May 24, 1977, to R. N. Penny, a mounting was provided for attaching a tubular member in coaxial registration with an aperture in a wall. The tubular member had, at one end thereof, a spigot which was to be fitted into an aperture in a supporting structure. A mounting supported the shroud member in co-axial registration with the aperture in the supporting structure. The mounting included the spigot, which was of complementary shape to the aperture. A plurality of radially-outwardly-extending lugs were spaced apart around the periphery of the spigot. The supporting structure had a corresponding number of notches spaced apar around the periphery of the aperture, the lugs, when aligned with the notches, being insertable through the notches by axial movement of the tubular member and then being retained, in the manner of a bayonet-type of coupling, by portions of the supporting structure between the notches when the tubular member has been partly turned about its longitudinal axis. The tubular member also had a flange spaced axially from the lugs and sealingly engageable with the supporting structure when the lugs were located behind the portions between the notches. The lugs and the flange together thus held the tubular member from axial movement with respect to the supporting structure.

U.S. Pat. No. 4,133,347, patented Jan. 9, 1979, by A. Mercer, teaches a waste evacuation attachment for a recreational vehicle. Such attachment comprises a rigid cylindrical housing readily mountable to the existing fittings of a sewage discharge outlet of the recreational vehicle. A telescoping hose is contained within the housing and has a fitting on the extendable end to adapt the hose to waste receiving receptacles. The assembly eliminates the difficulties inherent in conventional recreational vehicles which require the attachment and removal of a separate hose unit whenever the vehicle hooks up at an overnight site. The purpose of the nozzle provided on this device is to flush the hose and the pipes. The hose and pipe is a stub pipe sewage outlet and an accordian hose. The nozzle is glued to the connecting end piece. The nozzle has a hose fitting to permit the attachment and flushing of the attachment with a "garden hose". Any such hose which may exist at the trailer park is generally in the form of a flexible water hose connected to a stand pipe and with a nozzle fixedly secured to the end. In practice, the nozzle cannot be removed, and there would be no way to attach the end of the water hose to the fitting described in this patent.

Dozier et. al., U.S. Pat. No. 794,165, patented July 11, 1905, teaches a "Y" shaped soil pipe with a clean-out fitting having a threadedly-removable cap.

Franklin, U.S. Pat. No. 2,493,577, patented Jan. 3, 1950, shows a cam-carrying ring shaped to grip a faucet spout.

Tan, U.S. Pat. No. 3,605,135, patented Sept. 20, 1971, shows a sealing device fitted at the end of a hose so that a fluid-tight connector may be made with the drain of a sink.

Sakamoto, et. al., U.S. Pat. No. 4,234,217, patented Nov. 18, 1980, shows a pipe joint construction, including a main pipe and one or more branch pipes welded thereto in such a way as to improve rigidity.

Germain, U.S. Pat. No. 4,274,549, patented June 23, 1981, shows the securement of a flushing attachment in a manner whereby an inlet hose is gripped, and in which a baffle is provided which has port means for the passage of fuel vapors.

Baker, et. al., U.S. Pat. No. 4,319,366, patented Mar. 16, 1982, provides an air vent for a coupling device, the air vent being provided with a ball check valve.

Austrian Patent No. 219,913, dated Feb. 25, 1962, shows a quick connect-disconnect fitting.

SUMMARY OF THE INVENTION (i) Aims of the Invention

Of these patents, only the Mercer, U.S. Pat. No. 4,133,347, provided a teaching of a waste evacuation device. Even then there was no combined teaching of a simple device which would allow the waste-holding tank of the trailer to be flushed out with the water-hose while keeping the drain-hose attached to the drain-pipe of the holding tank so as to continue to direct the flushed-out waste, by means of a drain-hose, into the collector of the dump station and so avoid the spillage of waste in its vicinity.

(ii) Statement of Invention

By this invention, an attachment is provided for use in combination with a coupling device for coupling a drain hose to a drain pipe outlet from a waste holding-tank of a trailer, the drain pipe being equipped with a suitable valve to allow unrestricted gravity discharge from the waste holding-tank, the attachment comprising: (a) a hollow cylindrical section to which a drain hose for the conducting of waste from that waste holding-tank is adapted to be clamped; (b) an aperture of a size in relation to a flushing hose having a spray nozzle attached to the free end thereof to allow the insertion of the flushing hose and spray nozzle therethrough, the aperture being disposed in a forward peripheral portion of the hollow cylindrical section which becomes an upper forward peripheral portion when the hollow cylindrical collar and clamped drain hose is coupled to the drain pipe, for the insertion, through that aperture, of the flushing hose and spray nozzle, the flushing hose/spray nozzle being insertable through the aperture, through the hollow cylindrical section, through th valve in the drain pipe and directly into the waste holding-tank for injecting flushing water directly into the waste holding-tank while minimizing leakage through the aperture of flushed water and flushed-out waste from the waste holding tank the aperture being provided with a projecting hollow shaft therearound, the projecting hollow shaft being provided wih an elastomeric cover thereover, the elastomeric cover being provided with a slit therein, whereby the flushing hose may be inserted throught the slit and may be gripped by the slit; (c) a circular, ring-like flange secured to the end of the section which is remote from the drain hose; and (d) means extending from the exposed face of the flange for providing quick connect/disconnect engagement to cooperating members at the end of the drain pipe.

(iii) Other Features of the Invention

By one feature thereof, the means to provide the quick connect/disconnect engagement comprises: at least two lugs extending axially outwardly from the exposed face of the flange, each lug being provided with a hooked end for engagement by rotation with associated pins on the exposed circumferential face of the drain pipe, thereby to connect and seal the coupling device to the drain pipe.

By yet another feature thereof, the length of the split in the elastomeric cover is slightly longer than the external diameter of the flushing hose which is insertable through the aperture for allowing insertion of the flushing hose therethrough and for gripping the flushing hose inserted therethrough.

(iv) Generalized Description of the invention

Accordingly, in one of its most fundamental forms, the invention consists of an opening introduced into the outlet system of the waste holding-tank that allows the insertion of the flushing water-hose/spray nozzle into the waste holding-tank of the trailer without having to disconnect the drain-hose. Such an opening may be placed in the drain-pipe of the waste holding-tank either upstream or downstream of the valve, or in the device which couples the drain-hose to the drain-pipe, or in a separate piece of pipe to be interposed between the drain-hose coupler and the drain-pipe.

BRIEF DESCRIPTION OF THE DRAWINGS

In the accompanying drawings.

Figure 1:
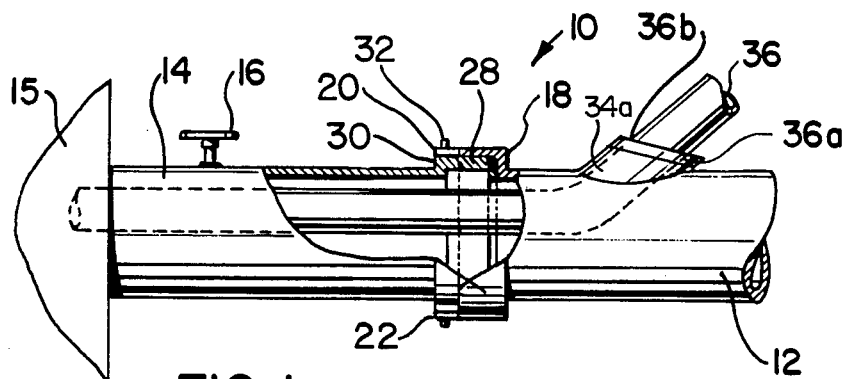
FIG. 1 is a schematic longitudinal view of the one embodiment of the coupling device of this invention, in its coupled and in-use mode.
Figure 2:
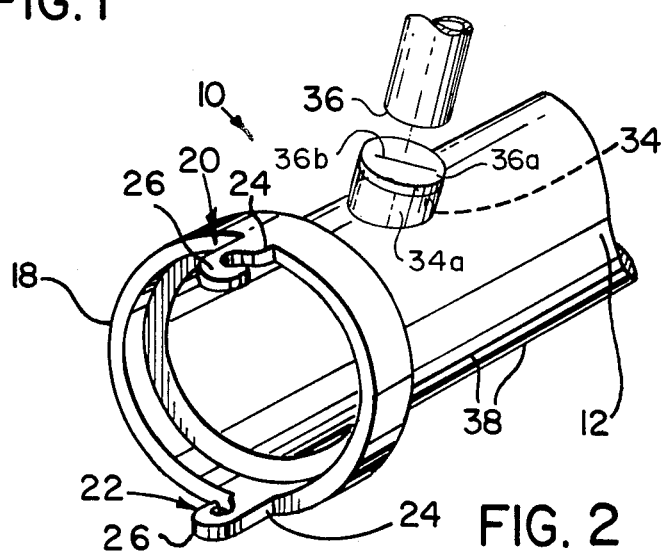
FIG. 2 is a perspective view of the embodiment of this invention of FIG. 1.

DESCRIPTION OF PREFERED EMBODIMENTS (i) Description of FIGS. 1 and 2

As seen in FIGS. 1 and 2, the device 10 consists of a cylindrical section 12, whose diameter is approximately that of the diameter of the drain-pipe 14 and to which a drain-hose (not shown) is clamped securely. The drain pipe 14 is connected to a waste holding-tank 15 and is provided with a hand-operated blade valve 16, which conventionally has the same open diameter as the internal diameter of the drain pipe to allow unrestricted gravity outflow from the waste holding-tank 15. The device also includes an integral cylindrical ring section 18 of internal diameter just sufficient to fit over the drain-pipe 14 [on a trailer (not shown)]. Lugs 20 and 22, each having a projecting portion 24 and a locking portion 26 serve to pull the device 10 firmly up against a sealing face 28 of a flange 30 of the drain-pipe 14. Drain pipe 14 is equipped with a pair of pins 32 with which the locking portions 26 of the lugs 20, 22 engage when the coupling-device 10 is rotated at the time of engagement.

The device 10 also includes an aperture 34 in the section 12, through which aperture the flushing water-hose 36 (with its spray nozzle attached) can be inserted. The aperture 34 is surrounded by a hollow shaft 34 which, in turn, is fitted with an elastomeric cover 36a (see FIGS. 1 and 2), through which the flushing water-hose 36 (with its spray nozzle, not shown, attached) may be inserted and gripped. The aperture 34 should be of sufficient width and length to allow insertion of the hose 36 (with its spray nozzle, not shown, attached). The elastomeric cover 36a is provided with a slit 36b whose length is slightly longer than the external diameter of the flushing hose 36 so that the cover 36a grips the hose 36. The aperture should, moreover, be placed in relation to the lugs 20, 22 in such a way that, when the lugs 20, 22 are engaged with the pins 32 on the drain pipe 14, the aperture 34 is near the upper surface of the coupling device 10 and of the drain pipe 14. The aperture is thus disposed in a forward peripheral portion of the hollow cylindrical section 12 which becomes an upper forward peripheral portion when the hollow cylindrical section 12 and the clamped drain hose 36 is coupled to the drain pipe 14.

The drain-hose 36 must be clamped to the coupling device in the lower region 38, so as not to obscure aperture 34.

Figure 3:
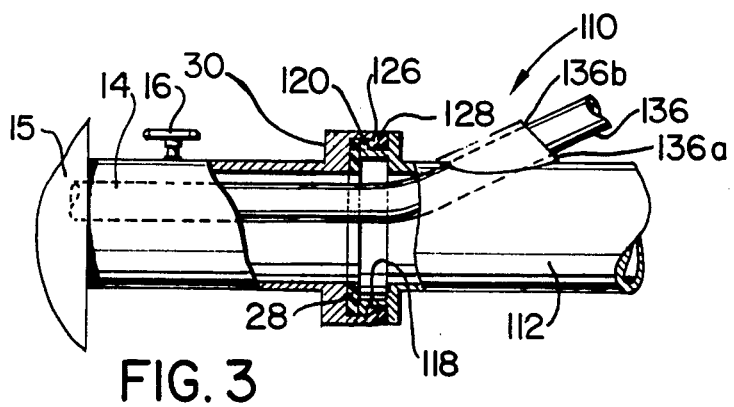
FIG. 3 is a schematic longitudinal view of a second embodiment of the coupling device of this invention.
Figure 4:
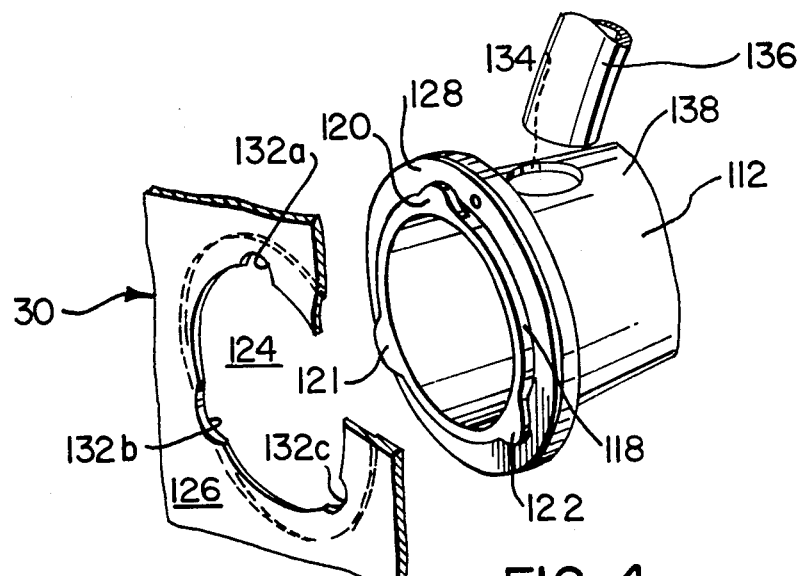
FIG. 4 is a perspective view of the embodiment of FIG. 3.

(ii) Description of FIGS. 3 and 4

In another embodiment shown in FIGS. 3 and 4, a cylindrical section 112 is shown which has, at one thereof, a ring-like flange 118 having an external cylindrical surface except for three circumferentially-spaced lugs, 120, 121, 122 and which is insertable in a circular aperture 124 in a sealing face 126 secured to the flange 30 of the drain pipe 14. The lugs 120, 121, 122 fit freely into respective complementary notches 132a, 132b and 132c formed in the sealing face 126 on axial insertion of the spigot 118 into the aperture 124. The cylindrical section 112 is then turned to bring the lugs 120, 121, 122 behind portions of the sealing face 126 which are not notched, and thus the spigot is retained from axial withdrawal, in an equivalent manner to that of a bayonet-type of coupling. The cylindrical section 112 has an external sealing flange 119 such that, when the cylindrical section 112 has been secured in the flange 30 by the lugs 120, 121, 122 engaging behind the sealing face 126 of the flange 30, the flange 119 will sealingly engage the sealing face 126. The flange 119 carries a curtain seal 128 formed, e.g. of rubber, and sealingly and resiliently engaging the sealing face 126. Thus, when the lugs 120, 121, 122 are engaged behind the sealing face 126, the curtain seal 128 sealingly engages the sealing face 126, the curtain seal 128 sealingly engages the sealing face 126, but it does permit relative sliding movement between the flange 119 and the sealing face 126.

The cylindrical section 112 is provided with an aperture 134 and hose 136, similar to aperture 34 and hose 36 of FIG. 2. In this embodiment, the opening 134 may be surrounded by a hollow shaft 136a whose internal diameter 136b is slightly larger than the external diameter of the flushing hose 136 (with its spray nozzle attached) insertable therein, so that the hollow shaft 136a grips the flushing hose 136, so as to minimize leakage around aperture 134.

The lugs 120, 121, 122 and the notches 132a, 132b, 133c may be made of any convenient shape and not only of the shape illustrated in FIG. 4.

Figure 5:
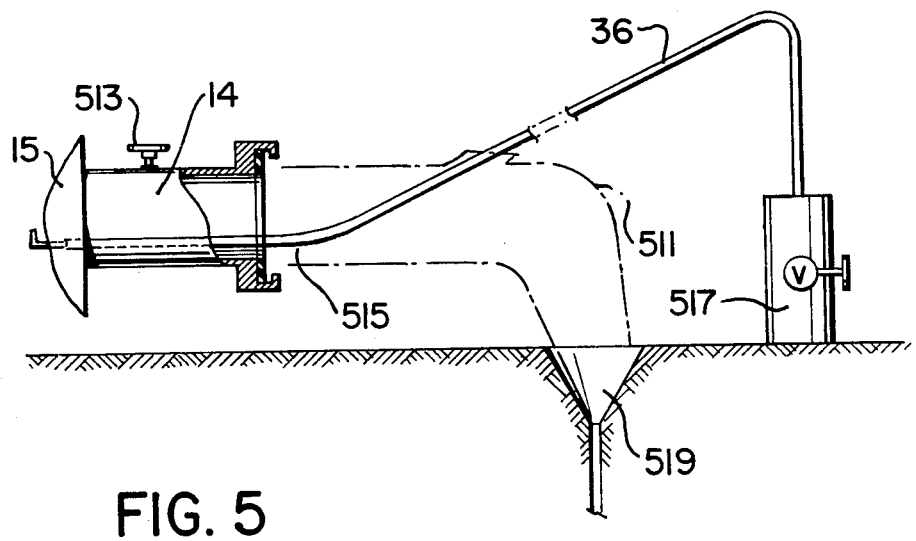
FIG. 5 a schematic representation of the conventional hook-up of a drain hose from the drain pipe of the waste holding tank to the waste receptacle of a trailer tank.

(iii) Description of FIG. 5

As seen in FIG. 5, in a conventional flushing-out of the waste holding tank 15, the drain pipe 511 is first connected to the drain pipe 14 and the blade valve 513 opened. The contents of the waste holding tank 15 drain out unhindered, by gravity flow to the drain 519. Then the drain pipe 511 is disconnected, and a flushing water hose 36 fitted with a nozzle 515 and drawing water under pressure from a stand pipe 517 is inserted into the drain pipe 14 through the slit in the elastomeric cover and into the cylindrical section, through the valve 513 and into the waste holding-tank 15. The solid waste build up on the inside of the waste holding-tank 15 is then dislodged and flows out by gravity along with the flushing water, into the general vicinity of the drain 519.

OPERATION OF PREFERRED EMBODIMENTS

The particular arrangement of diameters and lugs shown is common, but the invention clearly does not relate in any fundamental way to any such specific arrangement and can be realized on any practical arrangement. What is important is that, when the coupling device 10, 110, is engaged with the drain pipe 14, the opening 34, 134 be located in the upper portion of the surface in which it is located, and that the drain-hose (not shown) can be attached to the coupling device 10, 110 in the region 38 without obstructing the opening. Thus, in use, the flushing hose and its spray nozzle is inserted through the flexible gland on the surrounding hollow shaft, through the drain pipe and valve and into the waste holding-tank. The high velocity water injected from the spray nozzle on the flushing hose dislodges the solid waste build-up and the waste, along with the flushing water is conveyed directly to the drain.

REPRISE OF EMBODIMENTS OF THE INVENTION

A coupling device similar to that shown could be interposed between the drain-pipe and a drain-hose equipped with such a coupling if suitable couplings were provided. The invention then functions in exactly the same way as just described except that the drain water-hose coupling device is attached to the opposite end as modified with coupling means instead of the hose being clamped directly onto the device as shown.

The invention can also be provided as an addition to sections of the drain-pipe upstream or downstream of the valve or as a part of integral or non-integral extensions to the valve.

All embodiments of the invention should preferably have some appropriate form of covering for the opening 34, 134 to avoid inadvertent exit and entry when not actually in use. Such a covering can be provided in any one of numerous possible ways, either by means of a plug or a cover for the opening itself or by providing a plug or a cover for a built-up section around the opening having one of various possible shapes and heights. Such built-up section or covering can be chosen to facilitate the application of the invention in any particular circumstances, but does not in any significant way alter the basic invention as herein described.

A further refinement of the invention is provided by fitting the opening itself or the built-up section around it, when this exists, with a flexible gland through which the water-hose may be inserted and which provides a full or partial contacting seal around the water-hose. This refinement can take one of a great variety of forms but does not alter the invention in any fundamental way.

The embodiment of the invention described above in FIGS. 1 and 2 has been tested as a modification to the drain-pipe on a trailer on the downstream side of the valve. It has functioned excellently.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. An adaptor for use in combination with a coupling device for coupling a drain hose to a drain pipe outlet from a waste holding-tank of a trailer, said drain pipe being fitted with a valve allowing unhindered evacuation of waste from said waste holding tank by gravity, said adapter comprising:

(a) a hollow cylindrical section to which a drain hose for the conducting of waste from said waste holding-tank is adapted to be clamped;

(b) an aperture of a size in relation to a flushing hose having a spray nozzle attached to the free end thereof which is sufficient to allow the insertion of said flushing hose and spray nozzle therethrough, said aperture being disposed in a forward peripheral portion of said hollow cylindrical section which becomes an upper forward peripheral portion when said hollow cylindrical collar and said clamped drain hose is coupled to said drain pipe, for the insertion through said aperture of said flushing hose, and said spray nozzle, said flushing hose and said spray nozzle being insertable through said aperture, through said hollow cylindrical section, through said valve in said drain pipe and directly into said waste holding tank, for injecting flushing water directly into said waste holding tank while minimizing leakage through said aperture of flushed-out waste and flushing water from said waste holding-tank, said aperature being provided with a projecting hollow shaft therearound, said projecting hollow shaft being provided with an elastomeric cover thereover, said elastomeric cover being provided with a slit therein, whereby said flushing hose may be inserted through said slit and may be gripped by said slit;

(c) a circular ring-like flange secured to the end of said section which is remote from said drain hose; and (d) means extending from the exposed face of said flange for providing quick connect/disconnect engagement to cooperating members at the end of said drain pipe.

2. The adapter of claim 1 wherein said means (d) comprises: at least two lugs extending axially outwardly from said flange, each lug being provided with a hooked end for engagement, by rotation, with associated pins on the exposed circumferential face of said drain pipe, thereby to connect said adapter to said drain pipe.

3. The adapter of claim 2 wherein the length of said slit in said elastomeric cover is slightly longer than the external diameter of said flushing hose.

* * * * *